United States Patent [19]

Roe et al.

[11] Patent Number: 4,648,476

[45] Date of Patent: Mar. 10, 1987

[54] MOTOR VEHICLE

[75] Inventors: Douglas A. Roe, 4025 E. Winslow, Phoenix, Ariz. 85040; Terance D. Harp, Phoenix, Ariz.

[73] Assignee: Douglas Roe, Phoenix, Ariz.

[21] Appl. No.: 694,120

[22] Filed: Jan. 23, 1985

[51] Int. Cl.4 .............................................. B60K 5/12
[52] U.S. Cl. ...................... 180/297; 180/58; 180/63; 280/104
[58] Field of Search .............. 180/291, 295, 297, 299, 180/312, 63, 55, 56, 58, 902, 60; 280/104, 701, 772; 296/194

[56] References Cited

U.S. PATENT DOCUMENTS

| | | | |
|---|---|---|---|
| 974,745 | 11/1910 | Carlson | 180/294 |
| 1,020,518 | 3/1912 | Sandgren et al. | 180/294 |
| 1,770,279 | 7/1930 | Morrison | 180/294 |
| 1,948,745 | 2/1934 | Curtiss | 180/295 |
| 2,095,058 | 10/1937 | Cross | 180/294 |
| 2,378,810 | 6/1945 | Thornton | 180/294 |
| 2,439,659 | 4/1948 | Julien | 180/63 |
| 2,494,902 | 1/1950 | Sanmori | 180/294 |
| 2,689,014 | 9/1954 | Nallinger et al. | 180/56 |
| 2,756,834 | 7/1956 | Dauben | 180/295 |
| 3,679,017 | 7/1972 | Roe | 280/701 |
| 3,732,942 | 5/1973 | Hobbensiefken | 180/295 |
| 3,842,927 | 10/1974 | Tantlinger | 180/295 |
| 4,057,121 | 11/1977 | Stedman | 180/60 |
| 4,181,189 | 1/1980 | Hobbensiefken | 180/294 |
| 4,231,444 | 11/1980 | Telesio | 180/294 |
| 4,484,767 | 11/1984 | Klem | 280/772 |

Primary Examiner—John J. Love
Assistant Examiner—Eric D. Culbreth
Attorney, Agent, or Firm—Don J. Flickinger; Jordan M. Meschkow

[57] ABSTRACT

A drive unit including an engine and steerable wheels, is pivotally connected to the forward end of a chassis, including a body and ground support wheels. A pair of struts movably mounted to the chassis, equilaterally outboard and above the pivotal connection, extend downwardly inward to the drive unit and are movably affixed. In response to the natural tilt of the chassis while transversing a corner, weight is transferred through the struts to equalize traction upon the steerable wheels.

10 Claims, 7 Drawing Figures

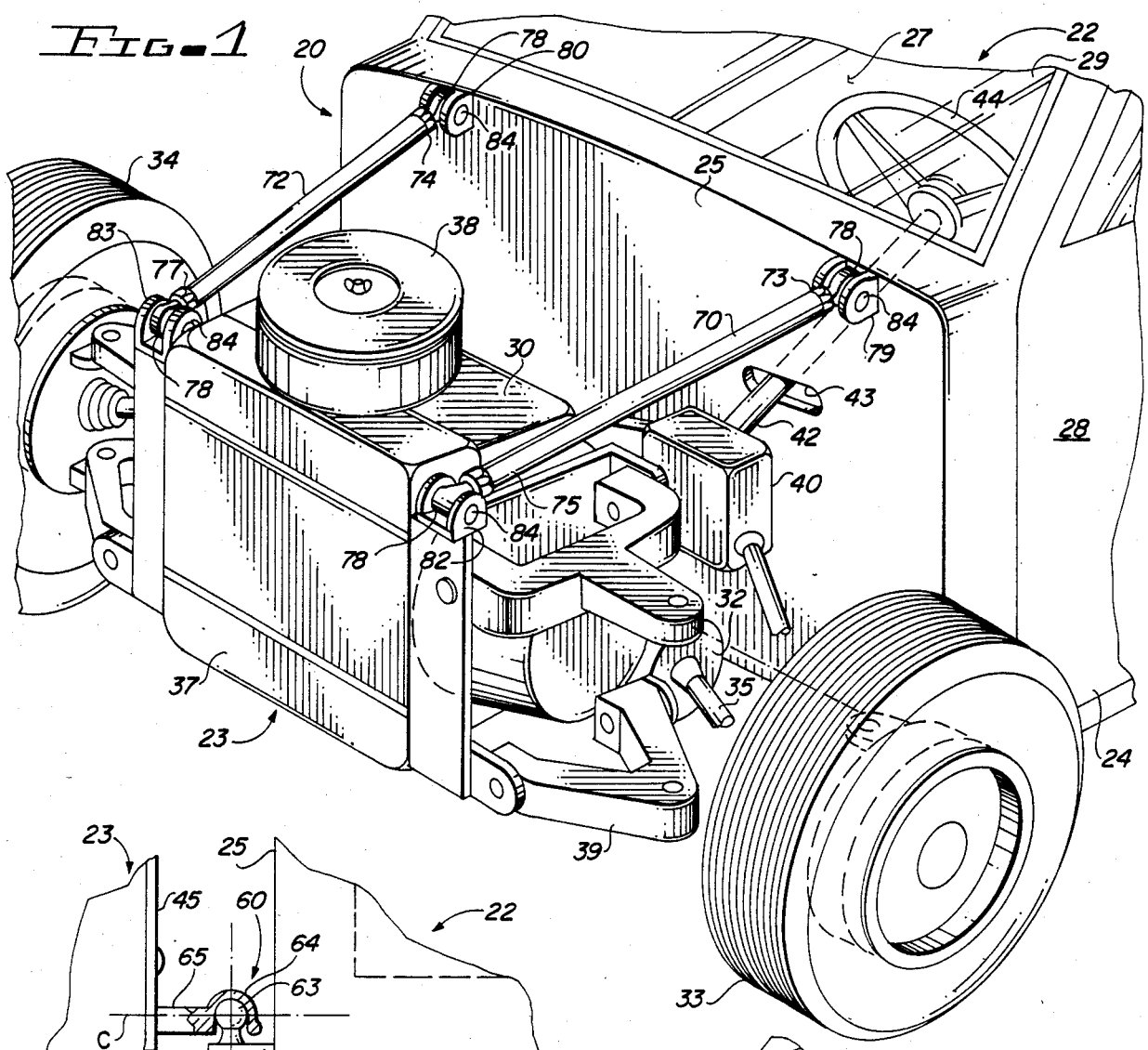
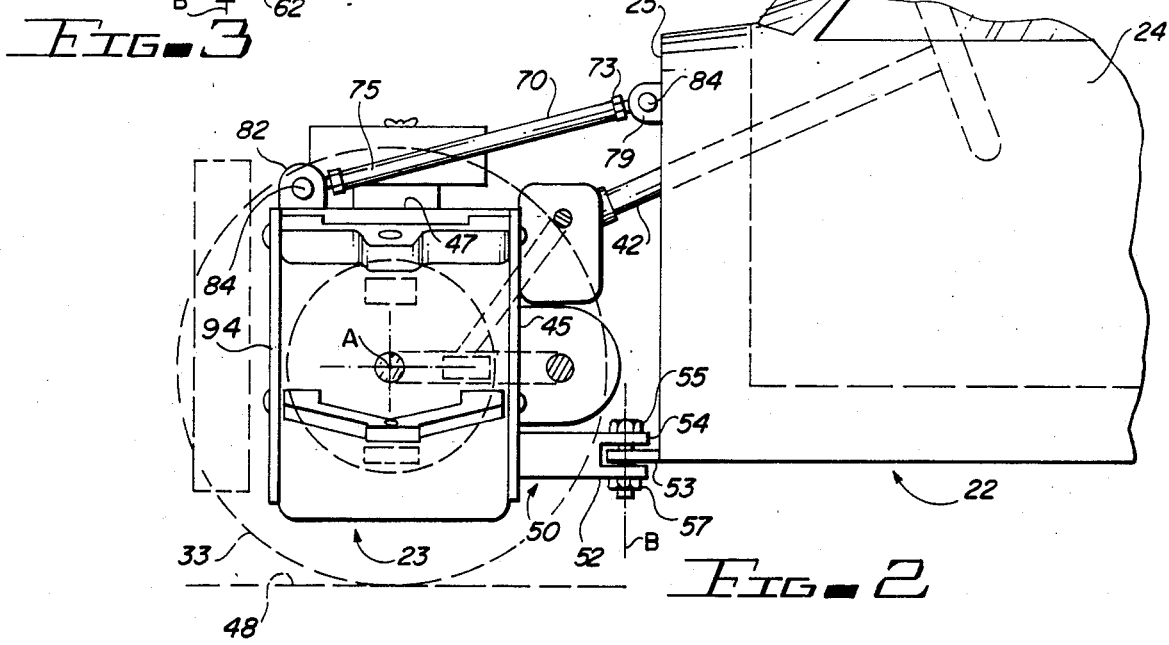

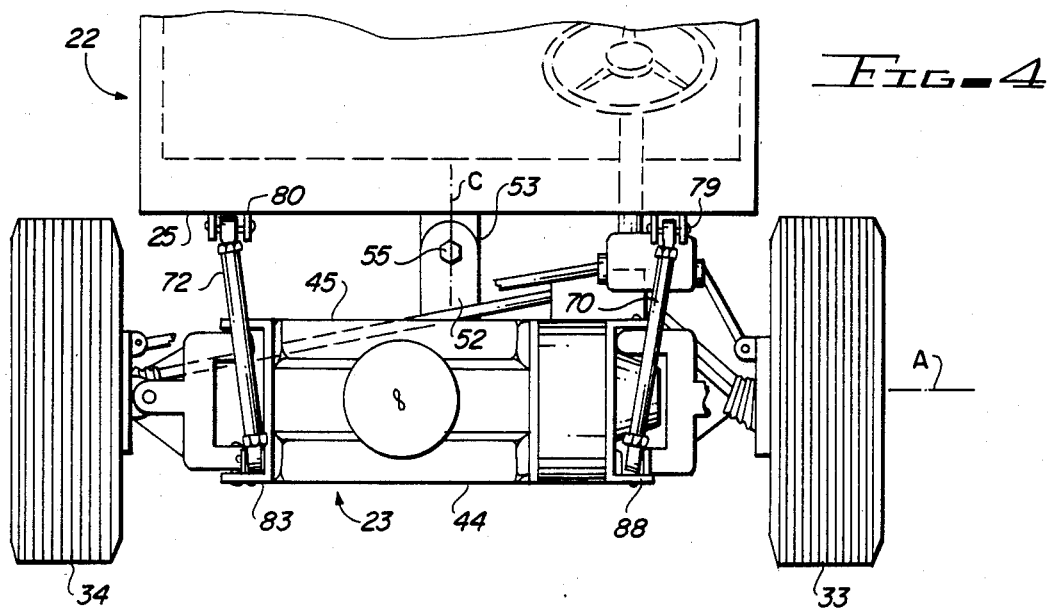
Fig-4
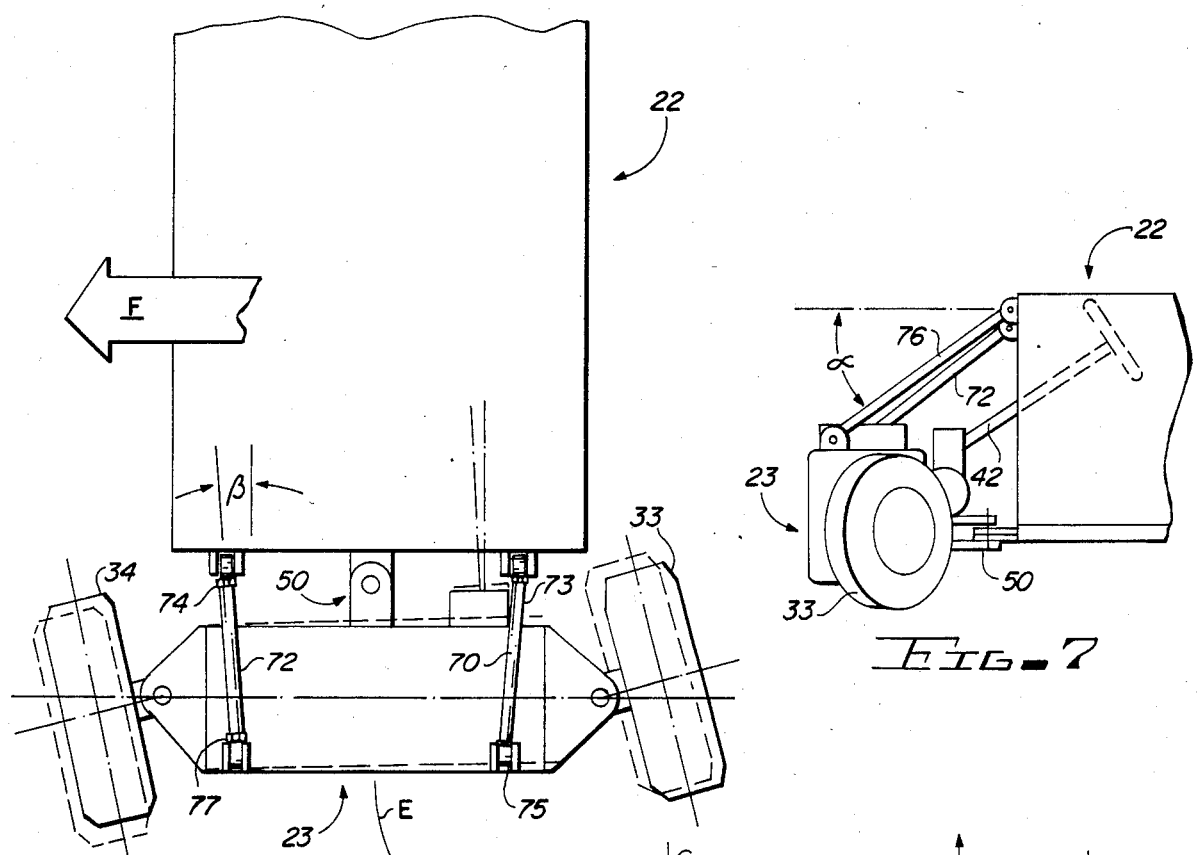
Fig-5
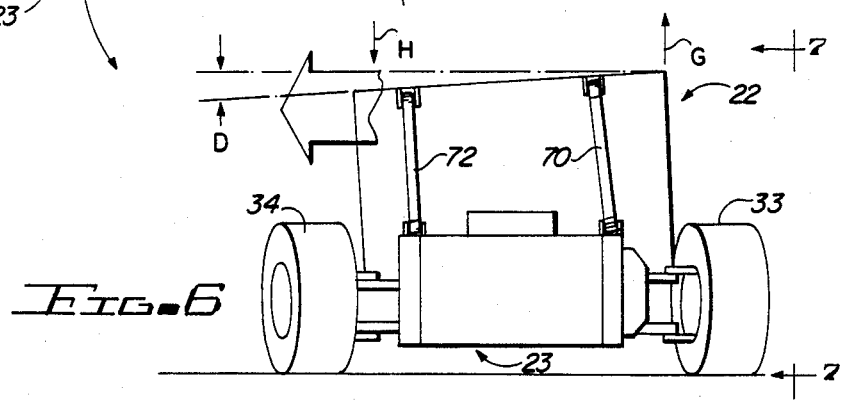
Fig-6
Fig-7

MOTOR VEHICLE

BACKGROUND OF THE INVENTION

1. Field of the Invention

This invention relates to motor vehicles.

More particularly, the present invention relates to self-propelled motor vehicles of the type having a pair of laterally spaced steerable wheels for directional control.

In a further and more specific aspect, the instant invention concerns improvements for increasing the directional stability of a motor vehicle, especially during turning or cornering.

2. Prior Art

Turning or cornering is an extremely unstable and inefficient maneuver for a motor vehicle. It is well known that a motor vehicle traveling in a straight line resists turning, in accordance with familiar natural phenomenon, and tends to continue to move in the pre-established direction. Even while traversing a curve, the vehicle exhibits an inherent tendancy to return to a more nearly straight path.

Numerous mechanical intricacies and principles of physics come into play when a motor vehicle is caused to deviate from straight line travel. The contemporary passenger automobile, for example, has a tread dimension, the measurement from center to center of a lateral pair of wheels, of generally between four and five feet. During linear motion of the vehicle, all of the wheels travel substantially the same distance. While traversing a curve, however, the several wheels, four in a conventional passenger automobile, travel differing distances.

Consider, for example, a vehicle having a tread dimension of four and one-half feet and traversing a 90° curve having a nominal radius of forty feet. The inboard wheels, turning upon a radius of thirty-seven and three-fourths feet, travel a distance less than thirty feet. The outboard wheels move through a distance greater than thirty-three feet as a result of the respective radius of forty-two and one-fourth feet.

All of the wheels of a vehicle negotiate a given maneuver within the same time. It is immediately apparent from the foregoing example, therefore, that the outboard wheels must rotate faster than the inboard wheels when a vehicle is turning. Equally obvious is the fact the steerable wheels, usually the front pair, must be set at different steering angles. That is, the inboard wheel must be turned or deflected at a greater angle from normal than the outboard wheel. The rear wheels, not usually having steering capability, do not track or follow the paths of the respective front wheels.

As a result of inertia, kinetic energy of the vehicle, the change of direction is resisted. Even though the steerable wheels are turned at a direction to establish the new course of travel, i.e., traversing a curve, the vehicle has an inherent tendancy to continue in the previous direction. After overcoming the initial resistance of turning, the vehicle is subjected to the effects of centrifugal force which tends to pull the vehicle in a direction away from the apex of the curve. Since the wheels are frictionally adhered to the surface of the road, centrifugal force has the effect of inducing tilt into the body of the vehicle.

The foregoing mechanical and physical factors are responsible for the instability of a motor vehicle while traversing a curve and the inefficiency of the maneuver. In a corner smartly taken, i.e., within limits of relative safety, neither reckless nor dawdling, the vehicle is caused to lean or tilt to the outside of the curve. The average passenger automobile will deflect approximately one and one-half inches such that a given point on the inboard side of the vehicle will be approximately three inches above the corresponding point on the outboard side.

The lean of the vehicle transfers weight from the inboard wheels to the outboard wheels. In the above described cornering maneuver, the weight on the outboard wheels will be approximately twice the weight on the inboard wheels. In other words, two-thirds of the weight of the vehicle will be borne by the outboard wheels while only one-third is carried by the inboard wheels.

Traction of the steerable wheels is a primary consideration affecting directional stability of a motor vehicle. The load upon the steerable wheels and the area of contact with the road are major contributors to traction. During cornering, the traction of the inboard steerable wheel is substantially reduced. Under extreme conditions, such as a slippery road surface or hard cornering in which the wheel may be even lifted from the road, the usefulness of the inboard steerable wheel is materially reduced or even negated.

Although under identical conditions the weight upon the outboard steerable wheel is materially increased, the area of contact with the road is not substantially increased. Accordingly, directional stability is greatly impaired. In a condition known as understeer, responding to inertia and centrifugal force, the vehicle tends to "plow" or travel in a straight line rather than turn in proportion to the steering angle of the steerable wheels.

Understeer is intensified in a vehicle having rear driving wheels which function to push the vehicle straight ahead. Front wheel drive vehicles suffer from a condition known as "torque steer", the inherent characteristic to veer laterally in response to acceleration. Accordingly, acceleration while traversing a curve can heighten the already unstable condition.

Front wheel drive vehicles, which are becoming increasingly popular and captivating an even greater share of the market, suffer from another notable shortcoming while cornering. It is well recognized by those in the automotive field that the inboard front wheel is most affected in terms of loss of traction as a result of cornering. It is also well known that conventional differential gearing will supply driving force to one of the pair of driving wheels that offers the least resistance to rotation. Accordingly, depending upon the speed at which the corner is traversed and the adhesion of the road surface, a substantial portion or even all driving force can be lost.

It would be highly advantageous, therefore, to remedy the foregoing and other deficiencies of the prior art for which solution has not heretofore been provided.

Accordingly, it is an object of the present invention to provide improvements for motor vehicles.

Another object of the invention is the provision of means for increasing the efficiency of a motor vehicle while traversing a curve.

And another object of this invention is to provide means for equalizing traction of the steerable wheels of a motor vehicle.

Still another object of the invention is the provision of an improved vehicle having a modular drive unit.

Yet another object of the immediate invention is to provide a vehicle which is readily serviceable.

Yet still another object of the invention is the provision of a front wheel drive vehicle which is inherently stable.

A further object of the instant invention is to provide means for transferring weight from the outboard steerable wheel to the inboard steerable wheel of a motor vehicle while traversing a curve.

And a further object of the invention is the provision of a motor vehicle which is capable of traversing a corner or curve at a greater rate of speed than contemporary vehicles.

And still a further object of the invention is to provide a vehicle having cornering capabilities such that the rear wheels tend to track with the front wheels.

Yet still a further object of the present invention is the provision of improvements, according to the above, which are relatively simple and economical to institute.

SUMMARY OF THE INVENTION

Briefly, to achieve the desired objects of the instant invention, there is provided a self-propelled motor vehicle comprising a chassis and a drive unit. The chassis includes a body and normal ground support wheels. The drive unit includes a pair of laterally spaced steerable wheels and a power unit for imparting rotation to at least one of the steerable wheels. Next provided are coupling means for securing the drive unit to the chassis and for substantially equalizing the contribution of each of the pair of steerable wheels in directing the vehicle while executing a turning maneuver. The coupling means further includes means for substantially equalizing the traction of each of the pair of steerable wheels in response to the execution of a turning maneuver by the vehicle. The traction is equalized by utilizing the tilt induced into the chassis by centrifugal force as the vehicle executes the turning maneuver to substantially equalize the load upon each of the pair of steerable wheels.

In accordance with an embodiment of the invention, the coupling means includes connection means pivotally joining the drive unit to the chassis forwardly of the body and first and second struts extending between the chassis and the drive unit. The struts, which are laterally spaced on opposite sides of the connection means, each include a first end movably affixed to the chassis and a second end movably affixed to the drive unit. The connection means, which preferably lies along the longitudinal axis of the vehicle, joins the drive unit to the chassis for relative rotation about vertical and horizontal axes. Each strut extends downwardly inward from the chassis to the drive unit.

In accordance with a more specifically preferred embodiment, the coupling means resides at a location spaced below the normal axis of rotation of the pair of steerable wheels. Each end of each strut resides at a location spaced above the normal axis of rotation of the pair of the steerable wheels. It is further preferred that the second ends of the struts are affixed to the drive unit at a location forward of the normal axis of rotation of the steerable wheels.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a partial perspective view of the forward portion of the improved vehicle of the instant invention, portions thereof being omitted for purposes of clarity of illustration;

FIG. 2 is a side elevational view of that portion of the vehicle seen in FIG. 1, the illustration being semidiagramatic for purposes of emphasizing the instant invention;

FIG. 3 is a fragmentary portion of the view of FIG. 2 illustrating an alternate connection means useful in connection with the instant invention;

FIG. 4 is a top plan view of that portion of the vehicle seen in FIG. 1;

FIG. 5 is a diagramatic view, generally corresponding to the view of FIG. 4, especially illustrating the action and function of the components while the vehicle is traversing a curve;

FIG. 6 is a front elevation taken from the view of FIG. 5; and

FIG. 7 is a side elevation taken from the righthand side of FIGS. 5 and 6.

DETAILED DESCRIPTION OF THE PREFERRED EMBODIMENTS

Turning now to the drawings in which like reference characters indicate corresponding elements throughout the several views, attention is first directed to FIG. 1 which illustrates a self-propelled motor vehicle, generally designated by the reference character 20 and embodying the principles of the instant invention, including a chassis and a modular drive unit generally designated by the reference characters 22 and 23, respectfully.

Chassis 22, in accordance with conventional practice, includes body 24 having forwardly located firewall 25 and enclosing passenger compartment 27. Also included is door 28 which provides access to passenger compartment 27 and windshield 29. Although not specifically illustrated, but as will be appreciated by those skilled in the art, chassis 22 further includes normal wheel means for supporting body 24 above the ground.

Modular drive unit 23, also in accordance with conventional practice, includes engine 30 and transaxle 32 which function as power means for imparting rotation to at least one of the ground contacting wheels 33 and 34 through drive axles 35. Radiator 37 provides cooling for engine 30 while fuel is supplied through fuel system 38.

Wheels 33 and 34, which are spaced on respective sides of vehicle 20, are supported by conventional suspension assemblies 39. Wheels 33 and 34 are also steerable by means of conventional steering assembly 40 including steering column 42 which passes through horizontal elongate opening 43 in firewall 25 and terminates with steering wheel 44 within passenger compartment 27.

The components of vehicle 20, chassis 22 and modular drive unit 23, herein illustrated have been chosen for purposes of illustration and orientation with regard to the instant invention. It is within the scope of the instant invention that a vehicle of known commercial manufacture of the front wheel drive type can be selected for the practice of the improvements of the instant invention, of which detailed description will made presently. It is also contemplated that the forward portion of the vehicle be completed by the addition of cowling, fenders, and other functional and decorative components as apropos of the art.

Coupling means, embodying the principles of the instant invention for securing drive unit 23 to chassis 22, are seen in greater detail with reference to FIGS. 2 and 4. For purposes of orientation, chassis 22 is considered to have a forward end which is coincident with firewall 25. Similarly, drive unit 23, which resides forward of chassis 22, includes forward end 94, rearward end 45, and top 47. The normal axis of rotation of the laterally spaced steerable wheels 33 and 34 is shown by the crossed lines in FIG. 2 and the broken line in FIG. 4, each designated by the reference character A. Ground level, represented by the broken line designated 48, is also seen in FIG. 2.

The inventive coupling means of the instant invention includes connection means pivotally joining the drive unit to the chassis. The preferred connection means, generally designated by the reference character 50 and seen in FIGS. 2 and 4, includes a first tongue 52 extending rearwardly from drive unit 23 and a second tongue 53 extending forwardly from chassis 22. First tongue 52 is provided with a bifurcated free end 54 for receiving second tongue 53. Bolt 55, passing through aligned bores in tongues 52 and 53 (not specifically illustrated) and secured by nut 57 connects drive unit 23 to chassis 22 for pivotal movement about a substantially vertical axis represented by the broken line B.

Although not specifically illustrated, but as will be appreciated by those skilled in the art, the bore in tongue 53 may be fitted with a bushing or self-aligning bearing receiving bolt 55 therethrough to accommodate twisting movement between chassis 22 and drive unit 23. The twisting movement is seen as slight relative rotation about a substantially horizontal axis represented by the broken line C in FIG. 4. The shank of bolt 55 functions as a pivot pin. Other known pin-type mechanical fasteners, providing the same function, may be utilized in place of bolt 55.

With reference to FIG. 3, there is seen an alternate connection means generally designated by the reference character 60 in the form of a ball and socket joint. Tongue 62, projecting forwardly from chassis 22, supports ball element 63. Socket 64, which matingly receives ball element 63, is carried by tongue 65 extending rearwardly from drive unit 23. Connection means 60 need not be specially fabricated, but can be chosen from among various commercially available types, such as those used for coupling a towed vehicle to a towing vehicle.

In general similarity to coupling means 50, alternate coupling means 60 provides for relative rotation about vertical and horizontal axes represented by the broken lines B and C, respectively. It is noted that the axes represented by the broken lines B and C intersect at a point which is spaced below and rearward of the axis of rotation, designated by the reference character A, of the wheels 33 and 34. More specifically, axis B resides an a location spaced rearwardly of axis A while axis C resides at a location spaced below the axis A. The location and the pivotal movement of the connection means will attain a significance as the description ensues.

The instant invention also includes a pair of struts, first strut 70 and second strut 72, which extend between chassis 22 and drive unit 23. First strut 70 and second strut 72 includes first ends 73 and 74, respectively, which reside adjacent chassis 22 and second ends 75 and 77, respectively, which reside adjacent drive unit 23. Each end of each stut is fitted with a self-aligning bearing fitting 78, such as the ones commercially exploited under the tradename "Himejoint", of which further description will be made presently.

Mounting brackets 79 and 80, specifically illustrated as clevises, are affixed to chassis 22. Similarly, mounting brackets 82 and 83 are affixed to drive unit 23. First end 73 of strut 70 is secured to mounting bracket 79 by pin 84 which extends through self-aligning bearing unit 78. In a similar manner, second end 75 of strut 70, first end 74 of strut 72, second end 77 of strut 72 are connected with brackets 82, 80, and 83, respectively, by additional pins 84. Pins 84 may be selected from various commercially available mechanical fastening means such as nuts and bolts or clevis pins.

In accordance with the immediately preferred embodiment of the invention, brackets 79 and 80 are spaced equilaterally outboard and above the location of the coupling means 50. Similarly, the brackets 82 and 83 are spaced equilaterally outboard and above the location of coupling means 50. The longitudinal axis of each pin 84 is normally horizontal. The term normal as used herein refers to the arrangement of the vehicle and the alignment of the components thereof when the vehicle is oriented for traveling along a straight line path. By virtue of the self-aligning bearing units 78, each end of each strut is pivotally movable about the longitudinal axis of each pin 84. Further, the first and second ends of each strut can accommodate relative torsion or independent rotation about the longitudinal axis of the strut.

In accordance with the immediately preferred embodiment of the instant invention, each end of each strut is journalled at a location spaced above the normal axis of rotation of the wheels 33 and 34. Further, the brackets 82 and 83 reside at a location spaced below the location of respective brackets 79 and 80. Further, the struts 70 and 72 are coupled to drive unit 23 at locations spaced forwardly of the normal axis of rotation of the wheels 33 and 34.

An experimental vehicle embodying the principles of the instant invention has been constructed and tested. Improvements, such as those hereinbefore described in connection with the drawings, were incorporated into a 1983 Buick Skyhawk. The standard drive unit was modified by replacement of the engine with one of substantially greater horsepower. The replacement engine, nevertheless, was one fabricated by the same automotive manufacturing concern.

The operation and functioning of the improved vehicle will now be described in connection with the diagramatic illustrations of FIGS. 5, 6, and 7. As set forth in the preceeding description, the struts 70 and 72 extend downwardly and inwardly from the chassis 22 to the drive unit 23. The downward angle, when the vehicle is in the normal configuration, is represented by the angle alpha in FIG. 7. The inward angle, when the vehicle is in the same configuration, is represented by the angle beta in FIG. 5. Through experimentation, it has been found that an angle alpha of approximately 25° to 30° yields satisfactory results. Similarly, it has been determined that an angle beta of approximately 15° is effective.

In the stock configuration, it was apparent that the vehicle was succeptible to torque steer. That is, the vehicle had a tendency to veer laterally under hard acceleration. "Plowing" or understeer was evident. The understeer increased in proportion to the speed at which the vehicle was traveling. As power was increased and decreased, the vehicle had a tendency to veer in alternate lateral directions. It was also observed that the inboard front wheel had a tendency to lift during hard cornering and spin as particularly noticeable on non-paved surfaces.

While traversing a corner, the vehicle evidences a body tilt or lean as demonstrated by the distance D in FIG. 6. In the immediate illustrations, it is assumed that the vehicle is turning in the direction indicated by the arcuate arrowed line E and subject to centrifugal force in the direction of arrowed line F. Accordingly, the inboard side of the vehicle is raised in the direction of arrowed line G while the outboard side of the vehicle is lowered in the direction of arrowed line H. A tilt, or distance D, of approximately three inches was observed in connection with the experimental vehicle while smartly maneuvering a corner.

As a result of the tilt of chassis 22, the first end 74 of the outboard strut 72 is lowered, decreasing the corresponding angle alpha and extending the effective horizontal length of strut 72. An opposite effect is had upon the inboard strut 70 as the result of the first end 73 being elevated. Accordingly, the outboard side of drive unit 23 is urged forwardly or in a direction away from chassis 22 while the inboard side of drive unit 23 is urged rearwardly toward chassis 22. For purposes of graphic visualization, the normal position of drive unit 23 and the associated wheels 33 and 34 are shown in solid outline in FIG. 5 and the displaced drive unit and wheels, in accordance with the foregoing description, are seen in broken outline.

In addition to the foregoing, the inventive coupling means herein described has the effect of transferring weight from the outboard wheel 34 to the inboard wheel 33. It is obvious that the full weight of the forward portion of the vehicle is borne by wheels 33 and 34. However, as strut 72 becomes more horizontal, it has a tendancy to lift wheel 34. Similarly, as strut 70 becomes more nearly vertical, greater weight is placed upon wheel 33. Imperical observation has shown that the weight upon wheels 33 and 34 while the vehicle is traversing a smartly driven curve is approximately equal. It has also been observed that the traction is substantially equal.

Imperical observation has shown other results attributable to the instant invention. In general, the vehicle is more predictable and more stable in cornering maneuvers. Torque steer and understeer have been substantially eliminated resulting in a vehicle having a faster response time in executing a turning maneuver. Also, greater power can be applied to the driving wheels before any traction is lost. Further, it has been observed that the rear wheels substantially track the respective front wheels.

Another important result achieved with the instant invention is the ability to provide and maintain excellent traction on both drive wheels under such adverse conditions that would normally render a conventional vehicle ineffective or useless. The conditions concern placement of the drive wheels on surfaces of differing heights or adhesion wherein one of the wheels of a conventional vehicle will normally spin uselessly instead of supplying motive force to the vehicle. It has been observed that the inventive vehicle previously described overcomes this deficiency of the prior art, as a result of the novel coupling means, by attaining and maintaining sufficient traction to overcome this obstacle and propel the vehicle.

Various changes and modifications to the embodiments herein chosen for purposes of illustration will readily occur to those skilled in the art. To the extent that such modifications and variations do not depart from the spirit of the invention, they are intended to be included within the scope thereof which is limited only by a fair assessment of the following claims.

Having fully described and disclosed the invention in such clear and concise terms as to enbale those skilled in the art to understand and practice the same, the invention claimed is:

1. A vehicle for self-propelled travel over the ground and for increased efficiency while executing an inherently unstable maneuver such as turning, said vehicle comprising:
   a. a chassis having a forward end including
      i. a body, and
      ii. wheel means for supporting said body above the ground;
   b. a drive unit having a forward end and a rearward end and including:
      i. a pair of laterally spaced steerable wheels for contacting the ground, said steerable wheels having a normal axis of rotation and
      ii. power means for imparting rotation to at least one of said pair of steerable wheels; and
   c. coupling means for securing said drive unit to said chassis and for substantially equalizing the contribution of each of said pair of steerable wheels in directing and propelling said vehicle, said coupling means including;
      i. connection means pivotally joining said drive unit to said chassis forwardly of said body;
      ii. a first strut laterally spaced from said connection means and extending between said chassis and said drive unit;
      iii. a second strut laterally spaced from said connection means in a direction opposite from said lateral spacing of said first strut and extending between said chassis and said drive unit, each said strut having a first end movably affixed to said chassis and a second end movably affixed to said drive unit, the second end of each of said struts being affixed to said drive unit at a location spaced above and forward of the normal axis of rotation of said pair of steerable wheels.

2. The vehicle of claim 1, wherein said connection means pivotally joins said drive unit to said chassis for relative rotation about a substantially vertical axis.

3. The vehicle of claim 2, wherein said connection means further pivotally joins said drive unit to said chassis for relative rotation about a substantially horizontal axis.

4. The vehicle of claim 3, wherein said connection means includes:
   a. a first tongue extending rearwardly from said drive unit and having a bore therethrough;
   b. a second tongue extending forwardly from said chassis and having a bore therethrough; and
   c. a pin extending through each of said bores.

5. The vehicle of claim 3, wherein said connection means includes a ball and socket joint.

6. The vehicle of claim 1, wherein the first end of each of said struts resides at a location above and outboard of the respective second end when said vehicle is traveling in a substantially straight path.

7. The vehicle of claim 6, wherein said connection means resides at an intermediate lateral location with respect to said chassis and said drive unit.

8. The vehicle of claim 7, wherein said intermediate lateral location resides below the normal axis of rotation of said pair of steerable wheels.

9. A vehicle for self-propelled travel over the ground and for increased efficiency while executing an inherently unstable maneuver such as turning, said vehicle comprising:
 a. a chassis having a forward end including
  i. a body, and
  ii. wheel means for supporting said body above the ground;
 b. a drive unit having a forward end and a rearward end and including
  i. a pair of laterally spaced steerable wheels for contacting the ground, said steerable wheels having a normal axis of rotation and
  ii. power means for imparting rotation to at least one of said pair of steerable wheels; and
 c. coupling means for securing said drive unit to said chassis and for substantially equalizing the contribution of each of said pair of steerable wheels in directing and propelling said vehicle, said coupling means including:
  i. connection means pivotally joining said drive unit to said chassis forwardly of said body;
  ii. a first strut laterally spaced from said connection means and extending between said chassis and said drive units; and
  iii. a second strut laterally spaced from said connection means in a direction opposite from the lateral spacing of said first strut and extending between said chassis and said drive unit, each said strut having a first end movably affixed to said chassis and a second end movably affixed to said drive unit, wherein:
 d. said connection means join the rearward end of said drive unit to the forward end of said chassis at an intermediate lateral location with respect to said vehicle;
 e. the first ends of said struts are affixed to the forward end of said chassis at respective location spaced equilaterally outboard and above the location of said connection means; and
 f. the second end of said struts are affixed to said drive unit at respective locations spaced equilaterally outboard and above the location of said connection means, each of said struts normally projecting downwardly inward in a direction from said chassis towards said drive unit and wherein the location at which each of the second ends of said struts are affixed to said drive unit resides closer to the forward end of said drive unit than the rearward end of said drive unit.

10. The vehicle of claim 9, wherein:
 a. the location of said connection means is below the normal axis of rotation of said steerable wheels; and
 b. the location of each of the ends of said struts is above the normal axis of rotation of said pair of steerable wheels.

* * * * *